United States Patent
Hiramatsu

(10) Patent No.: US 6,819,909 B1
(45) Date of Patent: Nov. 16, 2004

(54) BASED STATION APPARATUS AND COMMUNICATION METHOD

(75) Inventor: Katsuhiko Hiramatsu, Yokosuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 379 days.

(21) Appl. No.: 10/111,996
(22) PCT Filed: Aug. 24, 2001
(86) PCT No.: PCT/JP01/07243
§ 371 (c)(1), (2), (4) Date: Apr. 30, 2002
(87) PCT Pub. No.: WO02/21727
PCT Pub. Date: Mar. 14, 2002

(30) Foreign Application Priority Data

Sep. 1, 2000 (JP) ........................................ 2000-265480

(51) Int. Cl.[7] .............................. H04B 1/00; H04B 7/00
(52) U.S. Cl. ........................ 455/69; 455/67.13; 455/522; 455/13.4; 455/561; 455/570; 375/145; 375/149; 375/346; 375/347; 375/130; 370/336; 370/337; 370/350; 370/442
(58) Field of Search .............................. 455/69, 67.13, 455/522, 501, 13.4, 561, 570; 375/130, 149, 141, 145, 347, 231, 232, 346; 370/336, 350, 337, 347, 348, 442, 437

(56) References Cited

U.S. PATENT DOCUMENTS 6,584,150 B1 * 6/2003 Wu et al. .................... 375/231
6,603,797 B1 * 8/2003 Zeira et al. .................. 375/130
6,684,079 B1 * 1/2004 Aretz et al. .................. 455/502
6,724,815 B1 * 4/2004 Jepsen et al. ................ 375/225

FOREIGN PATENT DOCUMENTS

| JP | 09008770 | 1/1997 |
| JP | 2000151557 | 5/2000 |
| JP | 2001521327 | 11/2001 |

OTHER PUBLICATIONS

"3rd Generation Partnership Project; Technical Specification Group Radio Access Network; Physical Layer Procedures (TDD)," 3G TS 25.224 version 3.1.0, 3GPP Organizational Partners, 1999.

* cited by examiner

Primary Examiner—Marceau Milord
(74) Attorney, Agent, or Firm—Stevens, Davis, Miller & Mosher, LLP

(57) ABSTRACT

Data portion transmission power controlling section 108 increases/decreases the transmission power of the transmitting data to communication terminal apparatus A according to TPC from TPC command decoding section 106. Data portion transmission power controlling section 109 increases/decreases the transmission power of the transmitting data to communication terminal apparatus B according to TPC from TPC command decoding section 107. Midamble portion transmission power value determining section 100 adjusts the transmission power value to the transmission power value which is maximum among transmission power values of transmitting data to communication terminal apparatus A and communication terminal apparatus B, and controls the transmission power of a midamble portion to be transmitted commonly to all communication terminal apparatuses.

7 Claims, 3 Drawing Sheets

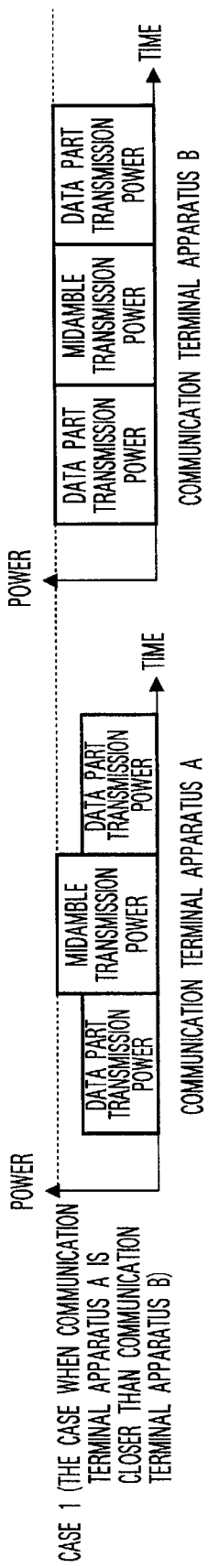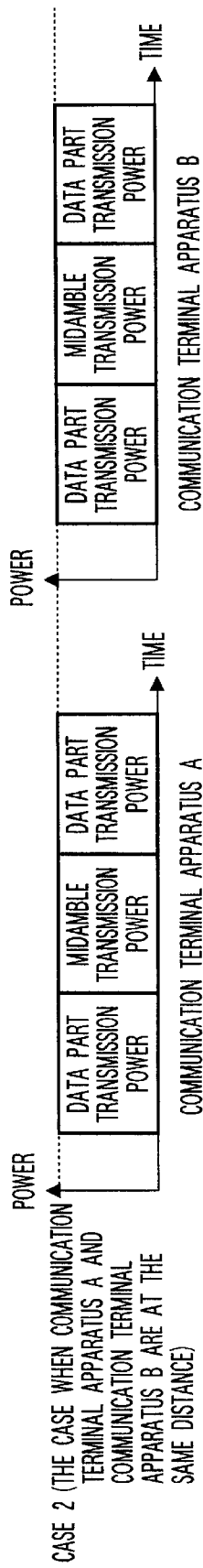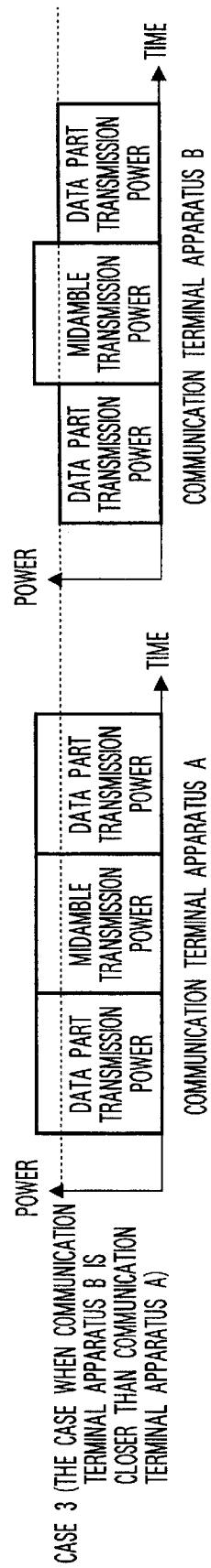

BASED STATION APPARATUS AND COMMUNICATION METHOD

TECHNICAL FIELD

The present invention relates to a communication apparatus used in a digital mobile communication system, specifically, relates to a communication apparatus which uses a known signal (midamble) to carry out channel estimation.

BACKGROUND ART

In a digital mobile communication system based on 3GPP/TDD technology, a known signal called (Midamble) which is used for carrying out channel estimation has been proposed. In a mobile communication system which adopts a midamble, since each user utilizes an individual midamble based on a code which is generated by sequentially time-shifting a basic code, there is a feature that it is possible, in a base station apparatus, to calculate the correlation of each user's individual midamble using only one correlator of the basic code. Therefore, it is possible to execute channel estimation of each user in base station apparatus.

However, since the length of the midamble assigned to each user increases as the number of users increases, the ratio of the information signal within slot decreases. Consequently, there is a problem of degrading the communication efficiency of the system.

Aiming at solving such a problem, a known signal which is employed commonly among users, namely, common midamble and which is used for channel estimation is introduced. In the mobile communication system using such a common midamble, abase station apparatus transmits a signal which includes a data part and midamble part (common midamble among users) to each user, and each user (each communication terminal apparatus) carries out channel estimation using the common midamble included in the signal transmitted by base station apparatus.

However, a mobile communication system using the aforementioned conventional common midamble has the following problem. That is, according to the current 3GPP/TDD specifications, it is specified that transmitting power of the data portion and midamble portion are equal within a slot when adopting the common midamble. Since the transmitting power of the data portion in the signal transmitted to each user cannot be individually controlled as, according to the specification, the transmitting power of the midamble portion and data portion are equal, hence, it is impossible to perform transmitting power control.

Consequently, because the receiving power of the data portion and midamble portion decreases which leads to user of bad communication quality (for instance, user which exists at a position far from base station apparatus), both channel estimation accuracy and data portion receiving quality are deteriorated. To improve the receiving quality of the user of bad communication quality, a method to increase the transmitting power of the data portion and midamble portion can be adopted. However, even if the receiving quality of a user in a cell serviced by a base station apparatus can be improved when adopting such a method, interference to cells serviced by other base station apparatuses thereby will be enlarged.

While cancelling the interference to other cells in a mobile communication system using a conventional common midamble, as mentioned above, there is a problem that it is difficult to appropriately control the transmitting power of midamble portion and data portion in the signal transmitted to each user so that receiving quality of each user may be improved.

DISCLOSURE OF INVENTION

It is an object of the present invention to provide a base station apparatus which appropriately controls the transmission power of a data portion and midamble portion in a signal transmitted to each communication terminal apparatus in order to improve the reception quality of each communication terminal apparatus while cancelling the interference to other cells.

This object can be achieved either to consider a data portion of a signal transmitted to a predetermined communication terminal apparatus while controlling the transmission power according to closed-loop transmission power control based on the reception quality of the aforementioned communication terminal apparatus or to consider a midamble portion of a signal transmitted to a predetermined communication terminal apparatus while controlling the transmission power to be common among all communication terminal apparatuses based on transmitting power value of the data portion of the signal transmitted to all communication terminal apparatuses.

BRIEF DESCRIPTION OF DRAWINGS

FIG. 3A is a view showing a transmitting power level (first case) from a base station apparatus to a communication terminal apparatus A and a communication terminal apparatus B according to Embodiment 1 of the present invention;

FIG. 3B is a view showing a transmitting power level (second case) from a base station apparatus to a communication terminal apparatus A and a communication terminal apparatus B according to Embodiment 1 of the present invention; and FIG. 3C is a view showing a transmitting power level (third case) from a base station apparatus to a communication terminal apparatus A and a communication terminal apparatus B according to Embodiment 1 of the present invention;

BEST MODE FOR CARRYING OUT THE INVENTION

First, the present inventor paid his attention to individually control both transmission power of an information signal (data portion) and transmission power of a common known signal (midamble portion) of a signal transmitted to each communication terminal apparatus. Specifically, the inventor paid his attention to perform the normal closed-loop transmission power control using a TPC transmitted from the communication terminal apparatus considering the data portion in the transmitting signal, and to perform the normal closed-loop transmission power control using the aforementioned TPC considering the midamble portion in the transmitting signal.

However, since the transmission power of the midamble portion in the signal transmitted to each communication terminal apparatus is set to be common among all communication terminal apparatuses, there is a problem of how the base station apparatus can control the transmission power of the midamble portion when receives different TPC from each communication terminal apparatus.

That is to say, although what is necessary is simply to increase/decrease transmission power of the midamble portion in the signal transmitted to each communication terminal when TPC indicates increasing/decreasing of the transmission power is received from all communication terminal apparatuses, there is a problem of how to control the transmission power of the midamble when the TPC received from certain communication terminal apparatus indicates an increasing of the transmission power while the TPC command received from another communication terminal apparatus indicates a decreasing of the transmission power. Specific example of such a problem is explained with reference to FIG. 1.

Figure 1:
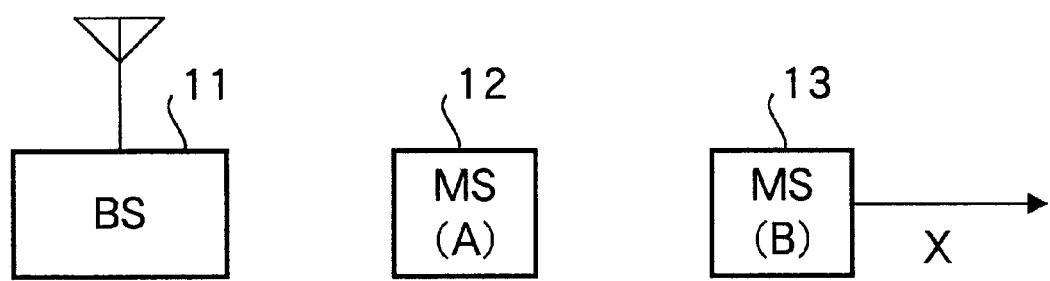
FIG. 1 is a block diagram showing an appearance of a radio communication between a base station apparatus and a communication terminal apparatus.

An exemplary case is shown in FIG. 1 when the base station apparatus 11 carries out communications with a plurality of communication terminal apparatuses (here, the communication terminal apparatus A12 and communication terminal apparatus B13). In addition, the communication terminal apparatus B13 is assumed to be located at a farther position from the base station apparatus 11 than the communication terminal apparatus A12. Moreover, the communication terminal apparatus A12 and communication terminal apparatus B13 are denoted, respectively, by "MS(A)" and "MS(B)" shown in FIG. 1.

First, a case when the base station apparatus 11 controls the transmission power of the midamble portion in the signal transmitted to the communication terminal apparatus A12 and communication terminal apparatus B13 based on the TPC from the communication terminal apparatus B13 is considered. Here, it is assumed that the communication terminal apparatus B13 moves to direction X away from the base station apparatus 11.

In this case, since the power received from the communication terminal apparatus B13 decreases along with the movement, the communication terminal apparatus B13 will transmit TPC command which indicates an increasing of the transmission power to the base station apparatus 11. Based on the TPC from the communication terminal apparatus B13, the Base station apparatus 11 increases the transmission power of the midamble portion included in the signal transmitted to the communication terminal apparatus A12 and communication terminal apparatus B13. Communication terminal apparatus B13, thereby, receives the midamble portion and data portion with good receiving quality. On the other hand, since the communication terminal apparatus A12 located at a position which is closer to the base station apparatus 11 than the communication terminal apparatus B13, the midamble portion is received with an extra receiving power beyond necessity. Consequently, the base station apparatus 11 transmits the midamble portion with an extra transmission power beyond necessity, thereby, interference to other cells is enlarged.

Next, the case when the base station apparatus 11 controls the transmission power of the midamble portion in a signal transmitted to the communication terminal apparatus A12 and communication terminal apparatus B13 based on a TPC from the communication terminal apparatus A12 is considered. Moreover, the communication terminal apparatus A12 is assumed to be located at a position near to the base station apparatus such that the receiving power is large enough.

In this case, since the receiving power of the communication terminal apparatus A12 is large, the communication terminal apparatus A12 will transmit a TPC command which indicates a decreasing of transmission power to the base station apparatus 11. Accordingly, the base station apparatus 11 decreases the transmission power of the midamble portion in the signal transmitted to the communication terminal apparatus A12 and communication terminal apparatus B13 relying to the TPC received from communication terminal apparatus A12. Therefore, the communication terminal apparatus A12 receives the midamble portion and data portion with moderate receiving power. On the other hand, since the communication terminal apparatus B13 located at a position farther from the base station apparatus 11 than the communication terminal apparatus A12, it might become difficult to receive the midamble portion and data portion with desired reception quality in the communication terminal apparatus B13. Consequently, it becomes difficult for the communication terminal apparatus B13 to carryout an accurate channel estimation as the reception quality of the data portion and midamble portion deteriorate. Therefore, the reception quality of the data portion of the communication terminal apparatus B13 further deteriorates.

In view of the above problem, the present inventor paid attention that a communication terminal apparatus whose transmission power value of the data portion transmitted from base station equipment among all communication terminal apparatuses is the maximum has the worst communication quality, then, the inventor finds out that the reception quality of the midamble portion of all communication terminal apparatuses can be kept sufficient with a necessary minimum cancellation of the interference to other cells which is due to the transmission of the midamble portion, if the transmission power value of the midamble portion included in the signal transmitted to all communication terminal apparatuses is determined based on the transmission power value of the data portion included in the signal transmitted to the aforementioned communication terminal apparatuses.

That is to say, the main feature of the present invention is to consider either a data portion of a signal transmitted to a predetermined communication terminal apparatus while controlling the transmission power according to closed-loop transmission power control based on the reception quality of the aforementioned communication terminal apparatus or to consider a midamble portion of a signal transmitted to a predetermined communication terminal apparatus while controlling the transmission power to be common among all communication terminal apparatuses based on the transmission power value which is maximum among the transmission power values of the data portion of the signal transmitted to all communication terminal apparatuses.

The embodiment of the present invention will be specifically described below with reference to accompanying drawings.

(Embodiment 1)

referring to the drawings, the details of the embodiment of the present invention will be given below, In addition, to simplify the following specific explanation of the embodiment, it is assumed that the base station apparatus, for instance, carries out communications with two communication terminal apparatuses (namely, the communication terminal apparatus A and communication terminal apparatus B).

Figure 2:
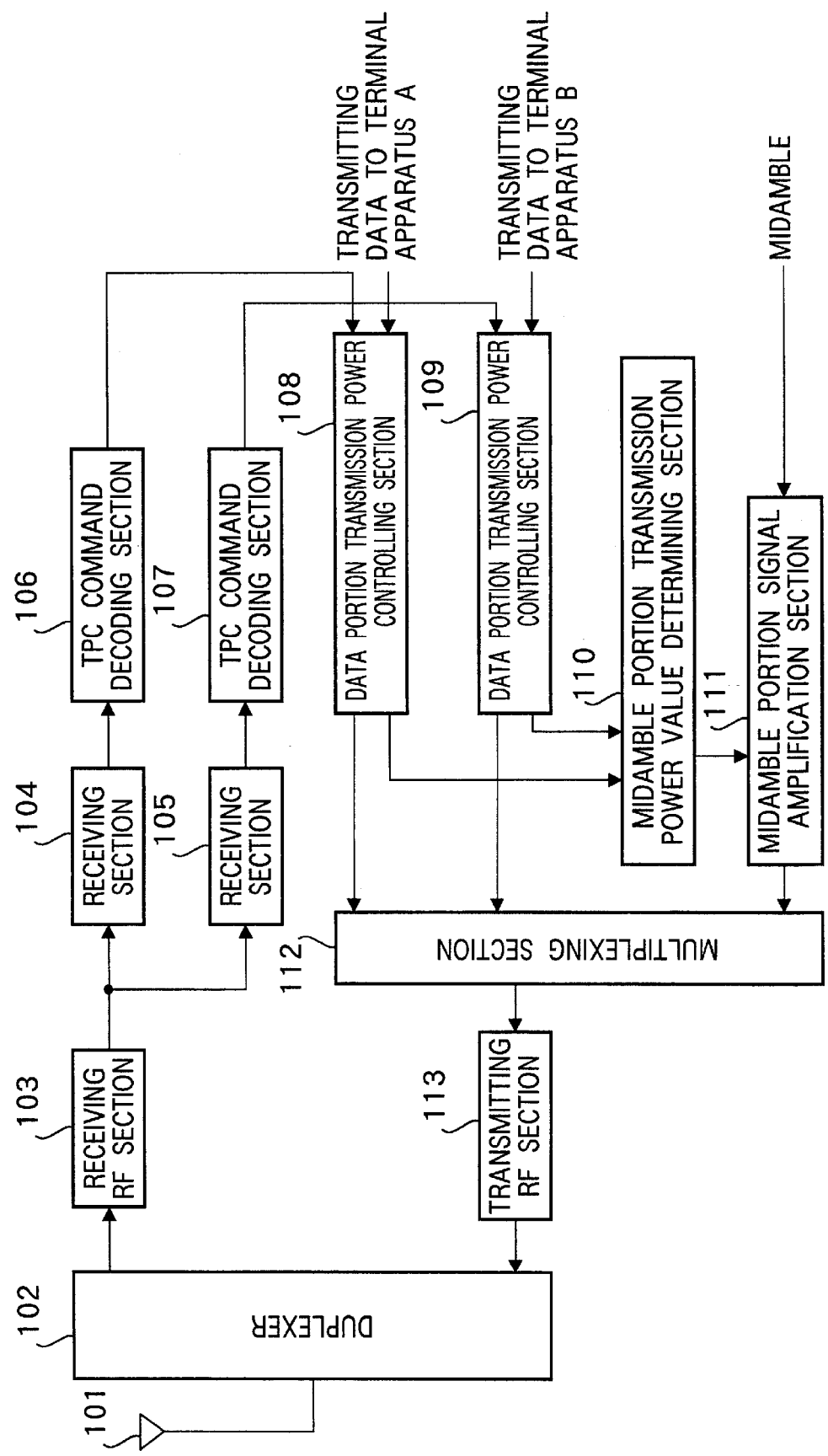
FIG. 2 is a block diagram showing a configuration of abase station apparatus according to Embodiment 1 of the present invention.

FIG. 2 is a block diagram showing a configuration of a base station apparatus according to the Embodiment of the present invention. Antenna 101 receives a multiplexed signal transmitted by the communication terminal apparatus A and communication terminal apparatus B. Here, the signal transmitted by communication terminal apparatus A (communication terminal apparatus B) includes a TPC by which the communication terminal apparatus A (communication terminal apparatus B) notifies the base station apparatus to increase/decrease the transmission power. This TPC is determined by communication terminal apparatus A (communication terminal apparatus B) based on the reception quality of the signal transmitted by the base station apparatus (for example, a certain known signal, etc.).

Duplexer 102 outputs the signal received by antenna 101 (receiving signal) to receiving RF section 103, and transmits the signal from transmitting RF section 113, to be described later, via antenna 101.

Receiving RF section 103 carries out predetermined reception processes such as amplification process, frequency conversion process, etc., on the receiving signal from duplexer 102, and outputs the receiving signal subjected to the predetermined reception processes to receiving section 104 and receiving section 105.

Receiving section 104 outputs the signal transmitted from communication terminal apparatus A which is extracted from the transmitting signal using the signal from receiving RF section 103 to TPC command decoding section 106. Similarly, receiving section 105 outputs the signal transmitted from communication terminal apparatus B which is extracted from the transmitting signal using the signal from receiving RF section 103 to TPC command decoding section 107.

TPC command decoding section 106 decodes the TPC command transmitted by communication terminal apparatus A using the signal extracted in receiving section 104. Similarly, TPC command decoding section 107 decodes the TPC command transmitted by communication terminal apparatus B using the signal extracted in receiving section 105.

Data portion transmission power controlling section 108 increases/decreases the transmission power of the data transmitted from communication terminal apparatus A based on TPC command from TPC command decoding section 106 and outputs the transmission data to which the transmission power is increased/decreased to multiplexing section 112. Moreover, data portion transmission power controlling section 108 outputs the transmission power value of the data transmitted from communication terminal apparatus A to midamble portion transmission power value determining section 110.

Data portion transmission power controlling section 109 increases/decreases the transmission power of the data transmitted from communication terminal apparatus B based on TPC command from TPC command decoding section 107 and outputs the transmission data to which the transmission power is increased/decreased to multiplexing section 112. Moreover, data portion transmission power controlling section 109 outputs the transmission power value of the data transmitted from communication terminal apparatus B to midamble portion transmission power value determining section 110.

Midamble portion transmission power value determining section 110 determines the transmission power value of the midamble portion using the transmission power value of the data transmitted by communication terminal apparatus A and outputted from data portion transmission power controlling section 108 and transmission power value of the data transmitted by communication terminal apparatus B and outputted from data portion transmission power controlling section 109, and outputs the result to midamble portion signal amplification section Midamble portion signal amplification section 111 amplifies or attenuates the transmission power of the midamble portion to the midamble portion transmission power value determined in midamble portion transmission power value determining section 110, and outputs the midamble portion to which the transmission power value is amplified/attenuated to multiplexing section 112.

Multiplexing section 112 generates a transmitting signal using the transmitting data to communication terminal apparatus A to which transmission power is increased/decreased in data portion transmission power controlling section 108, transmitting data to communication terminal apparatus B to which transmission power is increased/decreased in data portion transmission power controlling section 109, and midamble portion (common midamble) to which transmission power is amplified/attenuated in midamble portion signal amplification section 111, and outputs the generated transmitting signal to transmitting RF section 113.

Transmitting RF section 113 performs predetermined transmission processes such as amplification processing, frequency conversion processing, etc., on the transmitting signal outputted from multiplexing section 112, and outputs the transmitting signal being subjected to predetermined transmission processes to duplexer 102.

Next, operation of the base station apparatus which has the aforementioned configuration is explained with reference to FIG. 2. A signal transmitted by communication terminal apparatus A and signal transmitted by communication terminal apparatus B are received by antenna 101 of the base station apparatus in a code-multiplexed state.

The signal received by antenna 101 (receiving signal) is outputted to receiving RF section 103 through duplexer 102. The receiving signal from duplexer 102 being subjected to predetermined reception processes such as amplification processing, frequency conversion processing, etc., by receiving RF section 103 is outputted to receiving section 104 and receiving section 105.

In receiving section 0.104, the signal transmitted from communication terminal apparatus A is extracted from the receiving signal which is subjected to predetermined reception processes. Similarly, in receiving section 105, the signal transmitted from communication terminal apparatus B is extracted from the receiving signal which is subjected to predetermined reception processes. Specifically, the signal transmitted from communication terminal apparatus A or communication terminal equipment B is extracted, for example, by performing despreading processing using the spreading code which has been used in the receiving signal that is subjected to predetermined reception processes and which has been assigned to communication terminal apparatus A or communication terminal apparatus B.

The signal extracted by receiving section 104 is outputted to TPC command decoding section 106 whereas the signal extracted by receiving section 105 is outputted to TPC command decoding section 107.

In TPC command decoding section 106, the TPC command transmitted by communication terminal apparatus A is decoded using the signal extracted by receiving section 104 and then outputted to data portion transmission power controlling section 108. Similarly, in TPC command decoding section 107, the TPC command transmitted by communication terminal apparatus B is decoded using the signal extracted by receiving section 105 and then outputted to data portion transmission power controlling section 109.

On the other hand, the transmitting data to communication terminal apparatus A is outputted to multiplexing section 112 after the transmission power thereof is subjected to increase/decrease by data portion transmission power controlling section 108 based on the TPC command from TPC command decoding section 106. Moreover, the transmitting data to communication terminal apparatus B is outputted to multiplexing section 112 after the transmission power thereof is subjected to increase/decrease by data portion transmission power controlling section 109 based on the TPC command from TPC command decoding section 107.

In addition, if the TPC command from communication terminal apparatus A is a command that indicates an increasing of transmission power, the transmission power of the transmitting data to communication terminal apparatus A is increased in data portion transmission power controlling section 108 while if the TPC command from communication terminal apparatus A is a command that indicates a decreasing of transmission power, the transmission power of the transmitting data to communication terminal apparatus A is decreased in data portion transmission power controlling section 108. The transmission power of the transmitting data to communication terminal apparatus B is similarly increased/decreased.

The transmission power value of the transmitting data to communication terminal apparatus A being subjected to increase/decrease in data portion transmission power controlling section 108 is outputted to midamble portion transmission power value determining section 110. Similarly, the transmission power value of the transmitting data to communication terminal apparatus B being subjected to increase/decrease in data portion transmission power controlling section 109 is outputted to midamble portion transmission power value determining section 110.

The transmission power value of the transmitting data from data portion transmission power controlling section 108 and data portion transmission power controlling section 109 corresponding, respectively, to communication terminal apparatus A and communication terminal apparatus B are inputted to midamble portion transmission power value determining section 110. In addition, midamble portion transmission power value determining section 110 determines the transmission power value of the midamble portion and outputs the result to midamble portion signal amplification section 111.

Specifically, the transmission power value of the midamble portion can be set, for example, as the transmission power value which is the maximum value among the transmission power value of the transmitting data to communication terminal apparatus A and transmission power value of the transmitting data to communication terminal apparatus B. Alternatively, the transmission power value of the midamble portion can be set as the value of which a positive or negative offset value is added to the transmission power value which is the aforementioned maximum. Furthermore, the transmission power value of the midamble portion can be set also as the sum of the transmission power value of the transmitting data to communication terminal apparatus A and transmission power value of the transmitting data to communication terminal apparatus B.

The midamble portion which is commonly included in the transmitting signal to all communication terminal apparatuses (i.e., common midamble) is inputted to midamble portion signal amplification section 111. Where, the transmission power is amplified/attenuated so that the midamble portion transmission power may match the transmission power value set based on the transmission power value of the transmitting data to communication terminal apparatus A outputted from data portion transmission power controlling section 108 and the transmission power value of the transmitting data to communication terminal apparatus B outputted from data portion transmission power controlling section 109.

The midamble portion of which transmission power is amplified/attenuated in midamble portion signal amplification section 111 is outputted to multiplexing section 112.

In multiplexing section 112, a transmitting signal is generated using the transmitting data to communication terminal apparatus A and communication terminal apparatus B of which transmission power are increased/decreased and midamble portion of which transmission power is amplified/attenuated. As a specific example, the transmitting signal to communication terminal apparatus A is generated by time-multiplexing a predetermined known signal, midamble portion, transmitting data to communication terminal apparatus A, etc., similarly, the transmitting signal to communication terminal apparatus B is generated by time-multiplexing a predetermined known signal, midamble portion, transmitting data to communication terminal apparatus B, etc. Moreover, the transmitting signal is generated by code-multiplexing the generated transmitting signal of each communication terminal apparatus. In addition, there is no special limitations such as slot configuration, etc., of the transmitting signal to each communication terminal apparatus.

The transmitting signal generated by multiplexing section 112 is transmitted to each communication terminal apparatus from antenna 101 through duplexer 102 after being subjected to predetermined transmission processes such as amplification processing, frequency conversion processing, etc., in transmitting RF section 113.

Next, the effect of base station apparatus according to the embodiment is further explained with reference to FIG. 3A, FIG. 3B and FIG. 3C. FIG. 3A is a view showing a transmission power level (first case) from base station apparatus to communication terminal apparatus A and communication terminal apparatus B according to the embodiment of the present invention. FIG. 3B is a view showing a transmission power level (second case) from base station apparatus to communication terminal apparatus A and communication terminal apparatus B according to the embodiment of the present invention. FIG. 3C is a view showing a transmission power level (third case) from base station apparatus to communication terminal apparatus A and communication terminal apparatus B according to the embodiment of the present invention;

The left-hand side of FIG. 3A, FIG. 3B and FIG. 3C shows the transmission power of the transmitting signal to communication terminal apparatus A while the right-hand side shows the transmitting power of the transmitting signal to communication terminal apparatus B.

An exemplary explanation of the case where communication terminal apparatus A is located at a position which is closer to base station apparatus than communication terminal apparatus B, and communication terminal apparatus B moves away from base station apparatus is given below.

First, when communication terminal apparatus A is located at a position which is closer to base station apparatus than communication terminal apparatus B (first case), the number of transmitting the TPC command which indicates increasing of transmission power of the data portion to compensate for distance attenuation to base station apparatus from communication terminal apparatus B is larger than that of communication terminal apparatus A.

Therefore, the transmission power of the data portion of the signal transmitted to communication terminal apparatus B from base station apparatus shown in FIG. 3A becomes larger than the transmission power of the data portion of the signal transmitted to communication terminal apparatus A.

Accordingly, base station apparatus carries out transmission to each communication terminal apparatus after combining the midamble portion transmission power of the transmitting signal to each communication terminal apparatus and the data portion transmission power of the transmitting signal to communication terminal apparatus B.

Since the receiving power of the midamble portion according to such a transmission from base station apparatus is increased and channel estimation accuracy is improved, the reception quality of the data portion in communication terminal apparatus A is also improved.

On the other hand, the reception quality of the data portion becomes as necessary as sufficient because the normal closed-loop transmission power control is carried out in communication terminal apparatus B. Moreover, the transmission power of the midamble portion and transmission power of the data portion are subjected to the same transmission power in base station apparatus, resulting in a similar sufficient reception quality of the midamble portion and data portion in communication terminal apparatus B. Thereby, the reception quality of the data portion in communication terminal apparatus B is further improved.

Next, when the distance between base station apparatus and communication terminal apparatus B is the same as that between base station apparatus and communication terminal apparatus A (second case), the number of transmitting the TPC command which indicates increasing (decreasing) of the data portion transmission power from communication terminal apparatus B is the same as that of communication terminal apparatus A.

Thereby, the data portion transmission power of the transmitting signal from base station apparatus to communication terminal apparatus A, as shown in FIG. 3B, is the same as the data portion transmission power of the transmitting signal to communication terminal apparatus B.

Therefore, base station apparatus carries out transmission to each communication terminal apparatus after combining the midamble portion transmission power of the transmitting signal to each communication terminal apparatus and the data portion transmission power which is the maximum among data portion transmission power of communication terminal apparatus A and communication terminal apparatus B at every transmitting slot (unit slot).

The data portion reception quality becomes sufficient as the normal closed-loop transmission power control is carried out in communication terminal apparatus A and communication terminal apparatus B in accordance of such a transmission of base station apparatus. Furthermore, as the midamble portion transmission power and data portion transmission power are made equal in base station apparatus, the midamble portion reception quality and data portion reception quality in communication terminal apparatus A and communication terminal apparatus B become sufficiently equal. Thereby, the data portion reception quality of communication terminal apparatus A and communication terminal apparatus B are further improved.

Finally, in the case where communication terminal apparatus A is located at a position which is farther from base station apparatus than that of communication terminal apparatus B (third case), the number of transmitting the TPC command which indicates increasing the data portion transmission power transmitted from communication terminal apparatus A in order to compensate for distance attenuation to base station apparatus is larger than that of communication terminal apparatus B.

Therefore, as shown in FIG. 3C, the data portion transmission power of the signal transmitted from base station apparatus to communication terminal apparatus A becomes larger than the data portion transmission power of the signal transmitted to communication terminal apparatus B.

Thereby, base station apparatus performs transmission to each communication terminal apparatus after combining the midamble portion transmission power of the transmitting signal to each communication terminal apparatus and the data portion transmission power of the transmitting signal to communication terminal apparatus A.

Since in accordance with such a transmission of base station apparatus, the midamble portion receiving power is increased and channel estimation accuracy is improved in communication terminal apparatus B, the data portion reception quality is also improved. On the other hand, because the normal closed-loop transmission power control is carried out in communication terminal apparatus A, the data portion reception quality becomes sufficiently enough. Furthermore, as the midamble portion transmission power is made equal to the data portion transmission power in base station apparatus, the reception quality of the midamble portion and data portion become sufficiently equal in communication terminal apparatus A. Thereby, the reception quality of the data portion in communication terminal apparatus A is further improved.

As mentioned above, the base station apparatus, in any case from first case to third case, can transmit the data portion after the transmission power of each individual communication terminal apparatus being controlled so that the data portion reception quality becomes sufficient while being able also to transmit the midamble portion to all communication terminal apparatuses with a minimum required transmission power needed to carry out an accurate channel estimation by all communication terminal apparatuses.

Thereby, since the base station apparatus does not transmit the midamble portion using further transmission power beyond the necessary, it can suppress the interference to other cells as much as possible. Furthermore, since the transmission of the midamble portion to all communication terminal apparatuses is carried out with sufficient transmission power to achieve the midamble portion required reception quality, the base station apparatus can keep sufficient reception quality of the data portion for all communication terminal apparatuses.

It is needless to say that such an effect can be achieved similarly even if base station apparatus communicates with three or more communication terminal apparatuses. While cancelling the interference to other cells as much as possible, base station apparatus can keep good reception quality of each communication terminal apparatus simply by controlling the transmission power of the midamble portion of all communication terminal apparatuses based on the transmission power value which is the maximum among the transmission power values of the data portion of all communication terminal apparatuses even when the number of communication partners is increases. Here, "the maximum transmission power value" can be considered as "the transmission power value of the data portion of the communication terminal apparatus that is located at the farthest position from base station apparatus" or "the transmission power value of the data portion of the communication terminal apparatus which has the worst communication quality".

Moreover, even if the distances between base station apparatus and a plurality of communication terminal apparatuses (related to position) are time varying, base station apparatus can keep good reception quality of the data portion and midamble portion for all communication terminal apparatuses while being able to cancel the interference to other cells along with the movement of all communication terminal apparatuses by controlling the transmission power of the midamble portion based on newly updated maximum transmission power value within a present unit slot which replaces the transmission power value that has been maximum within a previous unit slot among data portion transmission power values of all communication terminal apparatuses. In addition, regarding to the aforementioned unit slot, it is the unit slot which can be properly changed.

Thus, in the present embodiment, regarding the data portion included in the transmitting signal to a predetermined communication terminal apparatus, the transmission power value is determined according to the closed-loop transmission power control based on the reception quality of the above-mentioned predetermined communication terminal apparatus. On the other hand, regarding the midamble portion included in the transmitting signal to the predetermined communication terminal apparatus, the transmission power value which becomes common among all communication terminal apparatuses is determined based on the transmission power value which is maximum among the transmission power values of the data portion transmitted to all communication terminal apparatuses. As a result, base station apparatus which appropriately controls the transmission power of the midamble portion and data portion in the transmitting signal to each communication terminal apparatus can be provided in order to improve the reception quality of each communication terminal apparatus while being able to cancel the interference to other cells.

In addition, in the present embodiment, although the case of setting the transmission power value of the common midamble portion in all communication terminal apparatuses based on the transmission power value which is maximum among the transmission power values of the data portion of each communication terminal apparatus is explained, the present invention is not limited to this, and it is possible to apply the case of setting the transmission power value of a known signal transmitted with a common transmission power value to all communication terminal apparatuses based on transmission power value of an information signal transmitted to each communication terminal apparatus after performing closed-loop transmission power control in each communication terminal apparatus.

Specifically, the present invention, as shown in the aforementioned embodiment, can be applied not only to the case of transmitting the time- multiplexed information signal and known signal which are transmitted to predetermined communication terminal apparatus, but can also be applied to the following case. However, in the following case, regarding the information signal, it is necessary to perform closed-loop transmission power control in every communication terminal apparatus.

That is to say, in the first case, the present invention possibly applies the transmission of a code-multiplexed information signal and known signal which are transmitted to predetermined communication terminal apparatus, and commonly transmitting of this known signal to all communication terminal apparatuses.

In the second case, the present invention possibly applies the case when the information signal and the known signal transmitted to the predetermined communication terminal apparatus through a respectively different channels (for instance, an information signal transmitted through DPCH and a known signal transmitted through CPICH), and transmitting of the known signal through the channel which is common among all communication terminal apparatuses.

Moreover, the present invention can be applied also when performing diversity transmission and diversity reception between base station apparatus and communication terminal apparatus.

As is clear from the above-mentioned explanation and according to the present invention, base station apparatus can provide, regarding to the data portion in the transmitting signal to predetermined communication terminal apparatus, the controlling of the transmission power according to closed-loop transmission power control based on the reception quality of the above-mentioned predetermined communication terminal apparatus. On the other hand, base station apparatus can also provide, regarding to the midamble portion in the transmitting signal to the predetermined communication terminal apparatus, the appropriately controlling of the transmission power of the midamble portion and data portion in the transmitting signal to each communication terminal apparatus such that the reception quality of each communication terminal apparatus is improved while being able to cancel the interference to other cells by controlling the transmission power value to be common between all communication terminal apparatuses based on the transmission power value which is maximum among the transmission power values of the data portion transmitted to all communication terminal apparatuses.

The present application is based on the Japanese Patent Application No. 2000-265480 filed on Sep. 1, 2000, entire contents of which is expressly incorporated by reference herein.

Industrial Applicability

The present invention is applicable to a digital mobile communication apparatus.

What is claimed is:

1. A base station apparatus comprising:
   data transmission power controlling means for separately controlling the transmission power of an information signal transmitted respectively to a plurality of communication terminal apparatuses based on the respective reception quality of the plurality of communication terminal apparatuses;
   known signal power value determining means for determining the transmission power value of a known signal transmitted commonly to all communication terminal apparatuses based on transmission power value of the information signal transmitted respectively to the plurality of communication terminal apparatuses, as the transmission power value of one information signal; and
   known signal amplification means for adjusting by increasing/decreasing the transmission power of the known signal transmitted to each communication terminal apparatus to the transmission power value determined in said known signal power value determining means.

2. The base station apparatus according to claim 1, wherein said known signal power value determining means which determines the maximum transmission power value among the transmission power values of the information signal transmitted to the plurality of communication terminal apparatuses as the transmission power value of the known signal.

3. The base station apparatus according to claim 1, further comprising generating means for generating a transmitting signal to communication terminal apparatus by time-multiplexing the transmitting information signal to communication terminal apparatus after being subjected to transmission power control in said data transmission power controlling means and after being subjected to known signal increased/decreased in said known signal amplification means.

4. The base station apparatus according to claim 1, wherein said known signal power value determining means determines the transmission power of the known signal based on a newly updated maximum transmission power value in a present unit slot which replaces the transmission power value that has been maximum in a previous unit slot among transmission power values of the transmitting information signal to all communication terminal apparatuses.

5. A base station apparatus that carries out radio communications with a communication terminal apparatus wherein the base station apparatus comprising;

data transmission power controlling means for separately controlling the transmission power of an information signal transmitted respectively to a plurality of communication terminal apparatuses based on the respective reception quality of the plurality of communication terminal apparatuses;

known signal power value determining means for determining the transmission power value of a known signal transmitted commonly to all communication terminal apparatuses based on transmission power value of an information signal transmitted respectively to the plurality of communication terminal apparatuses, as the transmission power value of one information signal; and known signal amplification means for adjusting by increasing/decreasing the transmission power of the known signal transmitted to each communication terminal apparatus to the transmission power value determined in said known signal power value determining means.

6. A communication method comprising:

step of controlling separately the transmission power of an information signal transmitted respectively to a plurality of communication terminal apparatuses based on the respective reception quality of the plurality of communication terminal apparatuses;

step of determining the transmission power value of a known signal transmitted commonly to all communication terminal apparatuses based on transmission power value of the information signal transmitted respectively to the plurality of communication terminal apparatuses, as the transmission power value of one information signal; and step of adjusting by increasing/decreasing the transmission power of the known signal transmitted to each communication terminal apparatus to the transmission power value determined in said known signal power value determining step.

7. The communication method according to claim 6, wherein said known signal power value determining step determines transmission power of the known signal based on a newly updated maximum transmission power value in a present unit slot which replaces the transmission power value that has been maximum in a previous unit slot among transmission power values of the transmitting information signal to all communication terminal apparatuses.

* * * * *